(12) United States Patent
Park et al.

(10) Patent No.: US 10,527,169 B2
(45) Date of Patent: Jan. 7, 2020

(54) POWER DELIVERY DEVICE FOR AUTOMATIC TRANSMISSION

(71) Applicants: Hyundai Motor Company, Seoul (KR); Kia Motors Corporation, Seoul (KR)

(72) Inventors: Juhyeon Park, Suwon-si (KR); Minho Chae, Incheon (KR); Yong Uk Shin, Suwon-si (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/111,800

(22) Filed: Aug. 24, 2018

(65) Prior Publication Data

US 2019/0178376 A1  Jun. 13, 2019

(30) Foreign Application Priority Data

Dec. 11, 2017 (KR) .......... 10-2017-0169261

(51) Int. Cl.
| | | |
|---|---|---|
| *F16H 63/30* | (2006.01) | |
| *F16D 65/18* | (2006.01) | |
| *F16D 55/40* | (2006.01) | |
| *F16D 129/04* | (2012.01) | |
| *F16D 121/04* | (2012.01) | |
| *F16D 127/02* | (2012.01) | |

(Continued)

(52) U.S. Cl.
CPC ........ *F16H 63/3026* (2013.01); *F16D 65/18* (2013.01); *F16D 55/40* (2013.01); *F16D 2121/04* (2013.01); *F16D 2125/06* (2013.01); *F16D 2125/10* (2013.01); *F16D 2127/02* (2013.01); *F16D 2129/04* (2013.01); *F16H 2063/303* (2013.01); *F16H 2063/3093* (2013.01)

(58) Field of Classification Search
CPC ........ F16H 63/3026; F16H 2063/3093; F16H 2063/303; F16D 65/18; F16D 55/40; F16D 2129/04; F16D 2121/04; F16D 2127/02; F16D 2125/06; F16D 2121/16; F16D 65/186; F16D 55/41; F16D 2121/10; B60T 1/062
See application file for complete search history.

(56) References Cited

U.S. PATENT DOCUMENTS 4,741,422 A * 5/1988 Fuehrer ............ F16D 25/12
192/106 F
5,172,799 A * 12/1992 Iijima ............ F16D 25/0638
192/106 F (Continued)

FOREIGN PATENT DOCUMENTS

JP  2015-190526 A  11/2015

*Primary Examiner* — Justin Holmes
(74) *Attorney, Agent, or Firm* — Morgan, Lewis & Bockius LLP

(57) ABSTRACT

A power delivery device configured for an automatic transmission may include a brake disposed between a rotation element connected to a brake hub and a transmission housing, and a piston device disposed corresponding to the brake and operating the brake by hydraulic pressure, wherein the power delivery device configured for an automatic transmission selectively connects the rotation element to the transmission housing by use of dual pistons.

10 Claims, 3 Drawing Sheets

(51) Int. Cl.
    *F16D 125/06*     (2012.01)
    *F16D 125/10*     (2012.01)

(56)            References Cited

U.S. PATENT DOCUMENTS 9,255,634 B2       2/2016  Sasaki et al.
 2012/0115663 A1*      5/2012  Wilton ................ F16D 25/0632
                                                              475/144
 2015/0276045 A1*     10/2015  Sasaki .................. F16D 25/063
                                                              475/146

* cited by examiner

POWER DELIVERY DEVICE FOR AUTOMATIC TRANSMISSION

CROSS-REFERENCE TO RELATED APPLICATION

The present application claims priority to Korean Patent Application No. 10-2017-0169261 filed on Dec. 11, 2017, the entire contents of which is incorporated herein for all purposes by this reference.

BACKGROUND OF THE INVENTION

Field of the Invention

The present invention relates to a power delivery device configured for an automatic transmission. More particularly, the present invention relates to a power delivery device configured for an automatic transmission which controls a gap between friction members and provides coupling force optimized for each operating stage by selectively connecting a rotation element to a transmission housing by use of dual pistons.

Description of Related Art

Environmentally-friendly technique of vehicles is very important technique on which survival of future motor industry is dependent. As regulations of exhaust gas become tightened, vehicle makers are focusing on development of environmentally-friendly vehicles to meet environment and fuel consumption regulations.

To enhance of fuel economy, researches on high efficiency engine, high efficiency transmission, vehicle body lightening, etc. is actively proceeding. Particularly, dual clutch transmissions, automated manual transmissions, etc. having advantages of both efficiency of manual transmissions and convenience of automatic transmissions are developed briskly in a transmission field.

According to such transmissions, a rotation element is selectively connectable to and is fixed to a transmission housing by a brake of dry or wet type. Particularly, since a brake used in a dual clutch transmission and an automated manual transmission resists against engine torque directly transmitted from an engine to the brake, great coupling force and control precision are demanded.

That is, a brake for such a dual clutch transmission and an automated manual transmission is required for quick operating speed of a piston for quick power delivery at a stage (i.e., an initial operating stage) where a piston moves to a brake disk and a brake plate that are friction members and is required for great coupling force for cutting off power rather than quick operating speed of the piston after the brake disk and the brake plate are coupled.

Recently, a brake provides quick operating speed of a piston and great coupling force in the present respect, but operating speed and coupling force are not precisely controlled for each operating stage. Accordingly, operating efficiency of a brake may be deteriorated.

Furthermore, as great coupling force of the piston is repeatedly applied to the brake plate with quick operating speed, the brake may be damaged due to accumulated fatigue.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power delivery device configured for an automatic transmission having advantages of rapidly controlling a gap between friction members and securing quick responsiveness and great coupling force by applying dual pistons sequentially operated to operate a brake.

Various aspects of the present invention are directed to providing a power delivery device configured for an automatic transmission having further advantages of preventing drag loss when the brake is released by a return spring directly operating the dual pistons.

A power delivery device configured for an automatic transmission according to an exemplary embodiment of the present invention may include a brake disposed between a rotation element connected to a brake hub and a transmission housing, and a piston device disposed corresponding to the brake and operating the brake by hydraulic pressure.

The piston device may include: a brake drum disposed apart from the brake on the transmission housing and having an internal circumferential portion and an external circumferential portion in parallel with each other in an axial direction thereof, wherein the external circumferential portion opposite to the brake is supported by a first stopper in the axial direction thereof; a first piston having an external circumferential portion closely contacting the external circumferential portion of the brake drum and an internal circumferential portion closely contacting the internal circumferential portion of the brake drum, and being movable toward the brake in the axial direction by receiving hydraulic pressure through a first hydraulic line formed in the transmission housing and the external circumferential portion of the brake drum; a second piston having an external circumferential portion closely contacting the external circumferential portion of the first piston and an internal circumferential portion closely contacting the internal circumferential portion of the brake drum, and having a front end portion directly applying operating force to the brake by receiving hydraulic pressure through a second hydraulic line formed in the transmission housing and the external circumferential portion of the brake drum and a third hydraulic line formed in the external circumferential portion of the first piston; a spring retainer mounted on the transmission housing; and a return spring mounted between the spring retainer and the second piston and applying restoring force to the first and second pistons.

Movement of the first piston toward the brake on the external circumferential portion of the brake drum in the axial direction may be limited by the spring retainer.

Movement of the spring retainer toward the brake in the axial direction may be limited by a second stopper mounted on the transmission housing between the brake and the second piston, and the spring retainer may support one end portion of the return spring.

The front end portion of the external circumferential portion of the second piston may penetrate through the spring retainer and may extend close to the brake.

Each of the first and second stoppers may be a stopper ring fitted onto the transmission housing.

Scalings may be located between the external circumferential portion of the first piston and the external circumferential portion of the brake drum and between the external circumferential portion of the second piston and the external circumferential portion of the first piston, respectively.

The internal circumferential portion of the first piston and the internal circumferential portion of the second piston may be disposed in parallel with each other in the axial direction thereof, and scalings may be located between the internal circumferential portion of the first piston and the internal circumferential portion of the brake drum and between the internal circumferential portion of the second piston and the internal circumferential portion of the brake drum respectively.

The rotation element may be one of three rotation elements of the planetary gear set including a sun gear, a planet carrier, and a ring gear.

According to an exemplary embodiment of the present invention, responsiveness may be improved by applying dual pistons for operating a brake and rapidly controlling a gap between friction members with high speed, and power delivery efficiency may be increased by securing coupling force.

Since accumulated fatigue repeatedly applied to a brake plate is minimized by rapidly controlling the gap between the friction members and achieving sufficient coupling force by use of the dual pistons, damage of the brake may be prevented.

According to an exemplary embodiment of the present invention, drag loss when releasing the brake is reduced by a return spring which is directly applied to the dual pistons.

Furthermore, since hydraulic pressure control is started at a region where hydraulic pressure is greater than a predetermined spring force of the return spring applied to the dual pistons, hydraulic pressure solenoid valve is not controlled at an unstable low-pressure region and control reliability may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
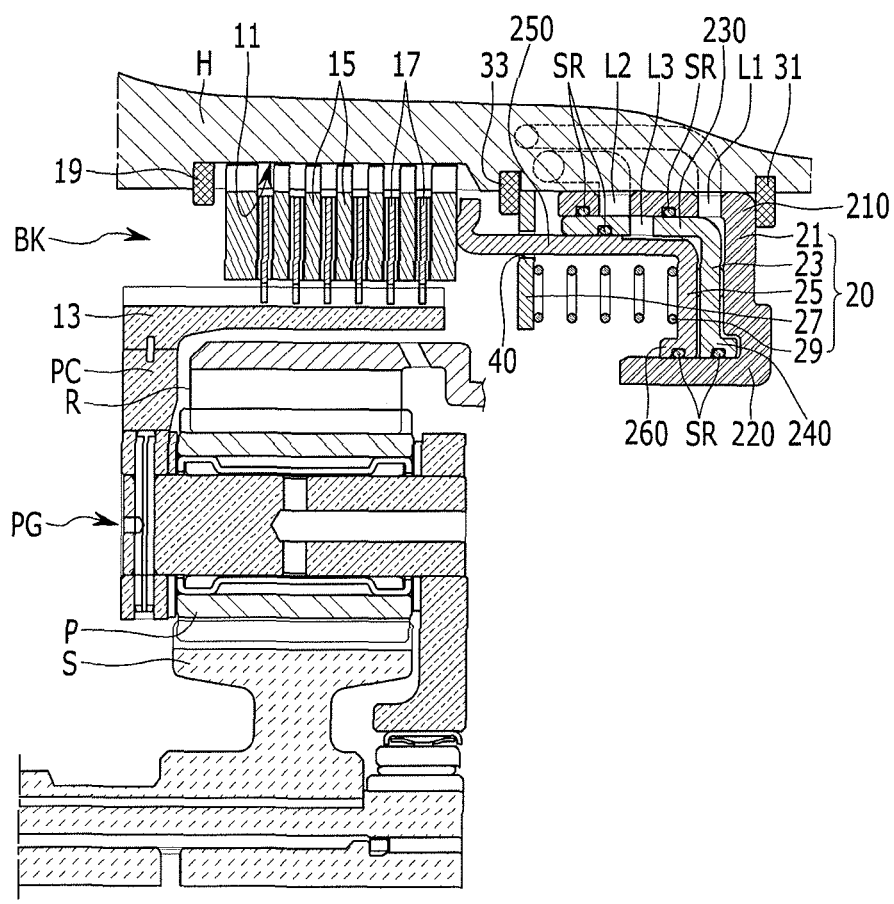
FIG. 1 is a cross-sectional view of a power delivery device configured for an automatic transmission according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a cross-sectional view of a power delivery device configured for an automatic transmission according to an exemplary embodiment of the present invention.

Referring to FIG. 1, a brake device disposed between a rotation element and a transmission housing H and cutting off power delivery to the rotation element will be referred to as an example of a power delivery device configured for an automatic transmission according to an exemplary embodiment of the present invention.

That is, a brake device is disposed between the rotation element and the transmission housing H and is configured to stop the rotation element. It is exemplified in the exemplary embodiment of the present invention that the brake device is disposed between a planet carrier PC which is one rotation element of a planetary gear set PG and the transmission housing H.

For example, the planetary gear set PG is a single pinion planetary gear set and includes a sun gear S, the planet carrier PC and a ring gear R as three rotation elements thereof. That is, the planetary gear set PG includes the sun gear S, the planet carrier PC rotatably supporting a plurality of pinion gears P disposed evenly at an external circumference of the sun gear S and engaged with the sun gear S, and a ring gear R engaged with a plurality of pinion gear P and operably connected to the sun gear S.

The brake device according to the exemplary embodiment of the present invention includes a brake BK including friction members between a spline portion 11 formed at an pinternal circumference of the transmission housing H and a brake hub 13, and a piston device 20 controlling operation of the brake BK.

That is, the spline portion 11 is engraved on the internal circumference of the transmission housing H, and a plurality of brake plates 15 is splined to the spline portion 11.

The brake hub 13 is connected to the planet carrier PC of the planetary gear set PG, and a plurality of brake disks 17 is splined to an external circumferential portion of the brake hub 13.

At the present time, the plurality of brake disks 17 is alternatively disposed with the plurality of brake plates 15, and the plurality of brake disks 17 and the plurality of brake plates 15 are supported in an axial direction by a snap ring 19 fitted onto a front end portion of the spline portion 11 of the transmission housing H.

Furthermore, the piston device 20 includes a brake drum 21 of annular shape, dual pistons including first and second pistons 23 and 25, and a spring retainer 27 and a return spring 29 applying restoring force.

A front end portion of the piston device 20 facing the brake BK operates the brake BK by hydraulic pressure to stop the planet carrier PC.

The brake drum 21 includes an external circumferential portion 210 and an internal circumferential portion 220 parallel with each other in the axial direction thereof, and the external circumferential portion 210 is supported in the axial direction by a first stopper 31 mounted on the internal circumference of the transmission housing H at an opposite side to the brake BK.

The first piston 23 is disposed inside of the brake drum 21, and sealings are located between the first piston 23 and the external circumferential portion 210 of the brake drum 21 and between the first piston 23 and the internal circumferential portion 220 of the brake drum 21. The first piston 23 is configured to move toward the brake BK with a predetermined distance by receiving hydraulic pressure through a first hydraulic line L1 formed in the transmission housing H and the external circumferential portion of the brake drum 21. The first piston 23 together with the second piston 25 pushes the plurality of brake plates 15 and the plurality of brake disks 17 to be closely contacted with each other, controlling a gap between the plurality of brake plates 15 and the plurality of brake disks 17.

The second piston 25 is disposed between the external circumferential portion 230 of the first piston 23 and the internal circumferential portion 210 of the brake drum 21. Sealings are disposed between an external circumferential portion 250 of the second piston 25 and the external circumferential portion 230 of the first piston 23 and between an internal circumferential portion 260 of the second piston 25 and the internal circumferential portion 220 of the brake drum 21. The second piston 25 directly applies operating force and supplies coupling force to the plurality of brake plates 15 and the plurality of brake disks 17 of the brake BK by receiving hydraulic pressure through a second hydraulic line L2 formed in the transmission housing H and the external circumferential portion 210 of the brake drum 21 and a third hydraulic line L3 formed in the external circumferential portion 230 of the first piston 23.

Furthermore, the external circumferential portions 230 and 250 of the first and the second pistons 23 and 25 are disposed in parallel with each other in the axial direction thereof, and the sealings SR are located between the external circumferential portion 230 of the first piston 23 and the brake drum 21 and between the external circumferential portion 250 of the second piston 25 and the external circumferential portion of the first piston 23. Therefore, the first and the second pistons 23 and 25 are movable in the axial direction with air-tightness being maintained.

Furthermore, the internal circumferential portions 240 and 260 of the first and the second pistons 23 and 25 are disposed in parallel with each other in the axial direction thereof, and the sealings SR are located between the internal circumferential portion 240 of the first piston 23 and the internal circumferential portion 220 of the brake drum 21 and between the internal circumferential portion 260 of the second piston 25 and the internal circumferential portion 220 of the brake drum 21. The internal circumferential portions of the first and the second pistons 23 and 25 are slidable on the internal circumferential portion of the brake drum 21 in the axial direction with air-tightness being maintained.

Furthermore, the spring retainer 27 is mounted on the transmission housing H between the brake drum 21 and the brake BK.

That is, the spring retainer 27 has a disk shape and movement of the spring retainer 27 toward the brake BK in the axial direction is limited by a second stopper 33 mounted on the transmission housing H.

For example, the second stopper 33 may be a stopper ring fitted onto the internal circumference of the transmission housing H.

Furthermore, both end portions of the return spring 29 are supported respectively by the spring retainer 27 and the second piston 25, and the return spring 29 applies restoring force to the first and the second pistons 21 and 23. The return spring 29 may include at least one coil spring.

Here, the external circumferential portion of the first piston 21 is configured to be movable in the axial direction on the external circumferential portion of the brake drum 21, and movement of the first piston 21 toward the brake BK may be limited to a predetermined distance by the spring retainer 27.

Furthermore, a front end portion of the external circumferential portion of the second piston 25 penetrates through a hole 40 of the spring retainer 27 and extends to be close to the brake BK.

Figure 2:
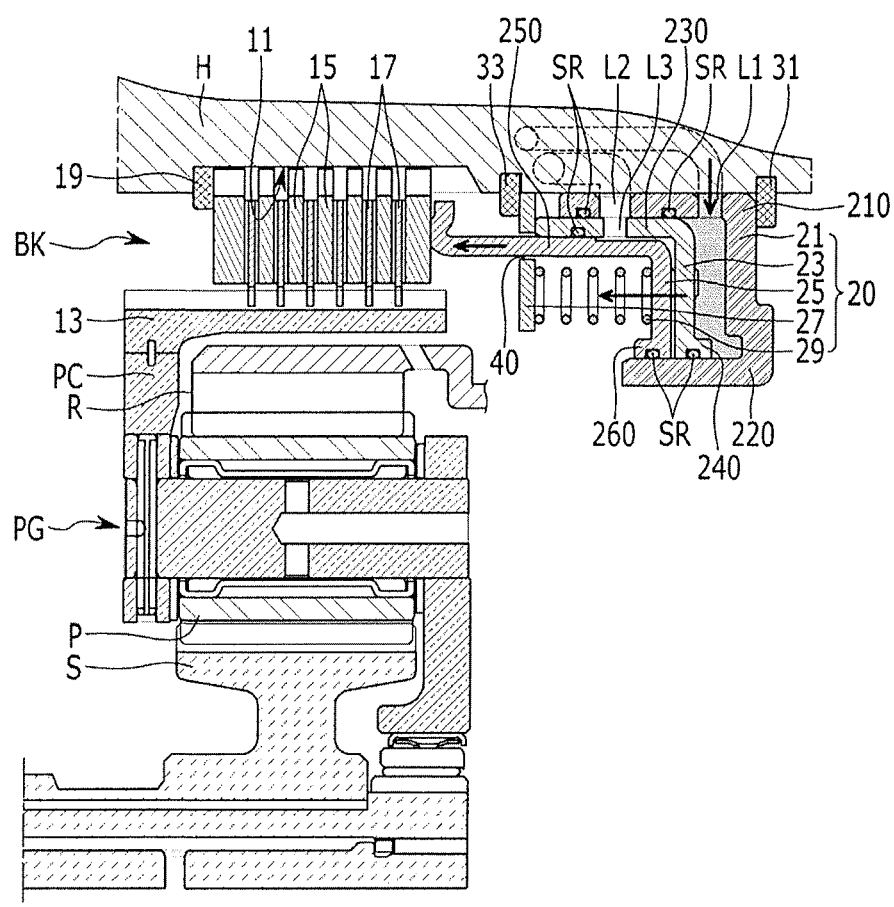
FIG. 2 is a cross-sectional view illustrating operation of a power delivery device configured for an automatic transmission according to an exemplary embodiment of the present invention at first stage.
Figure 3:
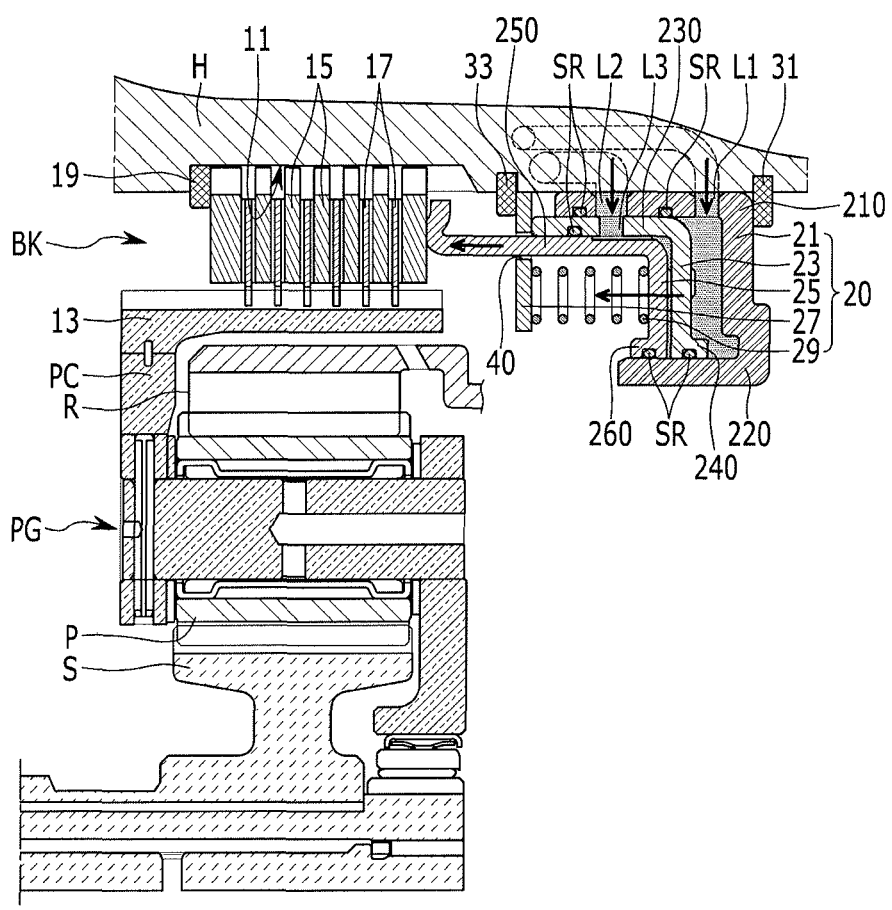
FIG. 3 is a cross-sectional view illustrating operation of a power delivery device configured for an automatic transmission according to an exemplary embodiment of the present invention at second stage.

FIG. 2 is a cross-sectional view illustrating operation of a power delivery device configured for an automatic transmission according to an exemplary embodiment of the present invention at first stage, and FIG. 3 is a cross-sectional view illustrating operation of a power delivery device configured for an automatic transmission according to an exemplary embodiment of the present invention at second stage.

Referring to FIG. 2 and FIG. 3, operation of the power delivery device according to the exemplary embodiment of the present invention will be described.

Referring to FIG. 2, if the hydraulic pressure is supplied between the brake drum 21 and the first piston 23 through the first hydraulic line L1 to operate the brake BK, the first piston 23 and the second piston 25 rapidly move toward the brake BK.

Accordingly, the front end portion of the second piston 25 moves to the brake plate 15 of the brake BK with fast speed and closely contacts the plurality of brake plates 15 with the plurality of brake disks 17 to control the gap between the brake plate 15 and the brake disk 17.

After that, referring to FIG. 3, if the hydraulic pressure is supplied between the first piston 23 and the second piston 25 through the second hydraulic line L2 and the third hydraulic line L3, the second piston 25 moves toward the brake BK from the first piston 23.

Accordingly, the front end portion of the second piston 25 pushes the brake plate 15 of the brake BK to supply the coupling force to the plurality of brake plates 15 and the plurality of brake disks 17.

The brake BK fixes the planet carrier PC of the planetary gear set PG to the transmission housing H and causes the planet carrier PC to be operated as a fixed member with quick responsiveness and sufficient coupling force due to two stage operations of the first and the second pistons 23 and 25.

Meanwhile, referring to FIG. 1, if the hydraulic pressure vanishes, the brake according to the exemplary embodiment of the present invention is released by elastic force of the return spring 29 directly applied to the first and the second pistons 23 and 25. Therefore, drag loss between the friction members may be prevented and control reliability may be enhanced.

The power delivery device according to the exemplary embodiment of the present invention utilizes the dual pistons including the first and second pistons 23 and 25 to operate the brake BK fixing the rotation element to the transmission housing H. Therefore, responsiveness may be improved by rapidly controlling the gap between the friction members and power delivery efficiency may be enhanced by securing sufficient coupling force.

Furthermore, since accumulated fatigue repeatedly applied to the brake plate 15 is minimized by rapidly controlling the gap between the friction members and achieving sufficient coupling force by two stage operation of the first and the second piston 23 and 25, damage of the brake BK may be minimized.

Furthermore, since hydraulic pressure control is started at a region where hydraulic pressure is greater than a predetermined spring force of the return spring 29 applied to the second piston 25, hydraulic pressure solenoid valve is not controlled at an unstable low-pressure region and control reliability may be enhanced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power delivery device for an automatic transmission, the power delivery device comprising:
    a brake mounted between a rotation element connected to a brake hub and a transmission housing; and
    a piston device mounted to the brake and operating the brake by hydraulic pressure applied to the piston device,
    wherein the piston device includes:
        a brake drum disposed apart from the brake and fixed on the transmission housing and having an internal circumferential portion and an external circumferential portion in parallel with each other in an axial direction of the brake drum,
        a first piston having an external circumferential portion slidably contacting the external circumferential portion of the brake drum and an internal circumferential portion slidably contacting the internal circumferential portion of the brake drum, wherein the first piston is selectively movable toward the brake in the axial direction by selectively receiving a first hydraulic pressure through a first hydraulic line formed in the transmission housing and the external circumferential portion of the brake drum;
        a second piston having an external circumferential portion slidably contacting the external circumferential portion of the first piston and an internal circumferential portion slidably contacting the internal circumferential portion of the brake drum, and having a front end portion applying operating force to the brake by selectively receiving a second hydraulic pressure through a second hydraulic line formed in the transmission housing and the external circumferential portion of the brake drum and a third hydraulic line formed in the external circumferential portion of the first piston; and
        a return spring mounted between the transmission housing and the second piston and applying restoring force to the first and second pistons.

2. The power delivery device of claim 1, further including a spring retainer mounted on the transmission housing, wherein the return spring is mounted between the spring retainer and the second piston.

3. The power delivery device of claim 2, wherein movement of the first piston toward the brake on the external circumferential portion of the brake drum in the axial direction is limited by the spring retainer.

4. The power delivery device of claim 2, further including a first stopper mounted on the transmission housing, wherein the external circumferential portion of the brake drum opposite to the brake is supported by the first stopper in the axial direction.

5. The power delivery device of claim 4, further including a second stopper mounted on the transmission housing between the brake and the second piston,
    wherein movement of the spring retainer toward the brake in the axial direction is limited by the second stopper, and
    wherein the spring retainer supports an end portion of the return spring.

6. The power delivery device of claim 5, wherein the front end portion of the external circumferential portion of the second piston penetrates through a hole of the spring retainer and extends adjacent to the brake.

7. The power delivery device of claim 5, wherein each of the first and second stoppers is a stopper ring fitted onto the transmission housing.

8. The power delivery device of claim 1, wherein sealings are located between the external circumferential portion of the first piston and the external circumferential portion of the brake drum and between the external circumferential portion of the second piston and the external circumferential portion of the first piston, respectively.

9. The power delivery device of claim 1,
    wherein the internal circumferential portion of the first piston and the internal circumferential portion of the second piston are disposed in parallel with each other in the axial direction thereof, and
    wherein sealings are located between the internal circumferential portion of the first piston and the internal circumferential portion of the brake drum and between the internal circumferential portion of the second piston and the internal circumferential portion of the brake drum respectively.

10. The power delivery device of claim 1, wherein the rotation element is one of a sun gear, a planet carrier, and a ring gear of a planetary gear set.

* * * * *